United States Patent
Xu et al.

(10) Patent No.: US 11,050,296 B2
(45) Date of Patent: Jun. 29, 2021

(54) DISPLAY CONTROL METHOD AND DEVICE

(71) Applicant: BEIJING ZHIGU RUI TUO TECH CO., LTD., Beijing (CN)

(72) Inventors: Ran Xu, Beijing (CN); Kuifei Yu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days.

(21) Appl. No.: 15/412,714

(22) Filed: Jan. 23, 2017

(65) Prior Publication Data

US 2017/0229061 A1    Aug. 10, 2017

(30) Foreign Application Priority Data

Feb. 4, 2016 (CN) .......................... 201610079666.X

(51) Int. Cl.
*G09G 3/30* (2006.01)
*H02J 50/00* (2016.01)

(52) U.S. Cl.
CPC ................ *H02J 50/00* (2016.02); *G09G 3/30* (2013.01); *G09G 2330/02* (2013.01); *G09G 2370/18* (2013.01)

(58) Field of Classification Search
CPC .......... G02F 1/00; H05B 33/00; G09G 3/005; G09G 3/02; G09G 3/025
See application file for complete search history.

(56) References Cited

U.S. PATENT DOCUMENTS

| 5,751,159 | A | * | 5/1998 | Holm | ................. | G01R 31/2635 |
| | | | | | | 324/754.07 |
| 2005/0200294 | A1 | * | 2/2005 | Naugler, Jr. | ........... | H05B 37/02 |
| | | | | | | 315/149 |
| 2012/0006978 | A1 | * | 1/2012 | Ludwig | ................. | G06F 3/0412 |
| | | | | | | 250/214.1 |
| 2014/0071098 | A1 | * | 3/2014 | You | ....................... | G06F 3/0487 |
| | | | | | | 345/179 |
| 2015/0029005 | A1 | * | 1/2015 | Kim | ....................... | A43B 3/001 |
| | | | | | | 340/12.5 |

(Continued)

FOREIGN PATENT DOCUMENTS

| CN | 101006540 | 7/2007 |
| CN | 101517634 | 8/2009 |
| CN | 101872267 | 10/2010 |

(Continued)

*Primary Examiner* — William Boddie
*Assistant Examiner* — Jeffrey Parker
(74) *Attorney, Agent, or Firm* — Sheppard Mullin Richter & Hampton LLP

(57) ABSTRACT

The present application provides a display control method and device, and relates to the display field. The method comprises: determining a beam shaping parameter according to to-be-displayed content and a location of a light-emitting diode (LED) array, wherein the beam shaping parameter comprises a beam direction, a beam intensity, and a scanning track; and sending a beam to the LED array according to the beam shaping parameter. According to the method and device, displayed content can be presented on an LED array through beam shaping. The LED array does not need input of a power supply and can implement a passive display, and therefore can be deployed more flexibly.

9 Claims, 3 Drawing Sheets

Determine a beam shaping parameter according to to-be-displayed content and a location of an LED array, wherein the beam shaping parameter comprises a beam direction, a beam intensity, and a scanning track ⎯⎯ S120

Send a beam to the LED array according to the beam shaping parameter ⎯⎯ S140

(56) References Cited

U.S. PATENT DOCUMENTS

2015/0351192 A1* 12/2015 Newton ............ H05B 33/0869
362/97.1

FOREIGN PATENT DOCUMENTS

| CN | 101893812 | 11/2010 |
|---|---|---|
| CN | 102236473 | 11/2011 |
| CN | 103997632 | 8/2014 |
| EP | 1258148 | 11/2002 |

* cited by examiner

DISPLAY CONTROL METHOD AND DEVICE

CROSS REFERENCE TO RELATED APPLICATION

The present application is based on and claims the benefit of priority to Chinese Application No. 201610079666.X, filed on Feb. 4, 2016, the entire contents of which are incorporated herein by reference.

TECHNICAL FIELD

The present application relates to the field of display technologies, and in particular, to a display control method and device.

BACKGROUND

With the development of display technologies, images can be presented to user eyes in an increasingly realistic manner, which significantly improves visual experience of people. At present, most display technologies are based on a liquid crystal display (LCD) screen, a principle of which is that backlight illuminates display pixels through liquid crystal molecules, and a rotation angle of the liquid crystal molecules is changed through voltage regulation to adjust transmittance, to display different content. Some other display technologies are based on an organic light-emitting diode (OLED), a principle of which is directly changing output light of a light-emitting diode (LED) through voltage regulation, to display different content.

In all of the display manners above, a power supply needs to be disposed on a display side, which is not flexible, and is inconvenient in deployment.

SUMMARY

An objective of the present application is to provide a display control method and device.

According to a first aspect of at least one embodiment of the present application, a display control method is provided, wherein the method comprises:

determining a beam shaping parameter according to to-be-displayed content and a location of an LED array, wherein the beam shaping parameter comprises a beam direction, a beam intensity, and a scanning track; and sending a beam to the LED array according to the beam shaping parameter.

According to a second aspect of at least one embodiment of the present application, a display control device is provided, wherein the device comprises:

a determining module, configured to determine a beam shaping parameter according to to-be-displayed content and a location of an LED array, wherein the beam shaping parameter comprises a beam direction, a beam intensity, and a scanning track; and a sending module, configured to send a beam to the LED array according to the beam shaping parameter.

According to a third aspect of at least one embodiment of the present application, a user equipment (UE) is provided, wherein the UE comprises:

a memory, configured to store an instruction; and a processor, configured to execute the instruction stored in the memory, wherein the instruction causes the processor to execute the following operations:

determining a beam shaping parameter according to to-be-displayed content and a location of an LED array, wherein the beam shaping parameter comprises a beam direction, a beam intensity, and a scanning track; and sending a beam to the LED array according to the beam shaping parameter.

According to the method and device, displayed content can be presented on an LED array through beam shaping. The LED array does not need input of a power supply and implements a completely passive display, and therefore can be deployed more flexibly.

DETAILED DESCRIPTION

Specific implementing manners of the present application are further described in detail below with reference to accompanying drawings and embodiments. The following embodiments are intended to describe the present application, but not to limit the scope of the present application.

A person skilled in the art understands that, in the embodiments of the present application, sequence numbers of the following steps do not mean an execution order, and the execution order of the steps should be determined according to their functions and internal logic, and shall not be construed as a limitation to implementation processes of the embodiments of the present application.

Figure 1:
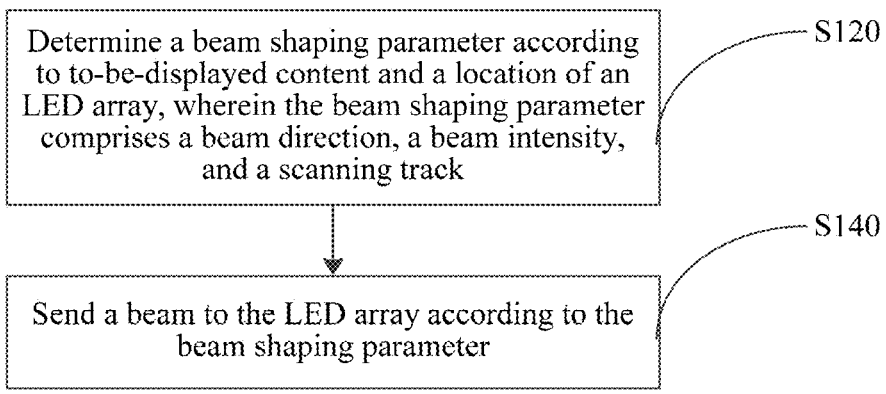
FIG. 1 is a flowchart of a display control method in an embodiment of the present application.

FIG. 1 is a flowchart of a display control method according to an embodiment of the present application. The method may be implemented on, for example, a display control device. As shown in FIG. 1, the method comprises:

S120: Determine a beam shaping parameter according to to-be-displayed content and a location of an LED array, wherein the beam shaping parameter comprises a beam direction, a beam intensity, and a scanning track.

S140: Send a beam to the LED array according to the beam shaping parameter.

According to the method in this embodiment of the present application, displayed content can be presented on an LED array through beam shaping. The LED array does not need input of a power supply and implements a completely passive display, and therefore can be deployed more flexibly.

Functions of steps S120 and S140 are described below in detail by using specific implementing manners.

S120: Determine a beam shaping parameter according to to-be-displayed content and a location of an LED array, wherein the beam shaping parameter comprises a beam direction, a beam intensity, and a scanning track.

The to-be-displayed content may be any content that can be displayed, for example, may be an image, a text, or a video. The LED array comprises multiple LED units. For example, the LED array is a 1024*768 array, and the LED array comprises 786432 LED units. The LED units may be illuminated after the beam is received.

The beam may be an electromagnetic beam, and may be output by an antenna array. The beam shaping parameter is a related parameter of a beam generated by using a beam shaping technology. Specifically, the beam may be output by controlling an antenna array. The beam generally comprises a main lobe and a side lobe, and the beam shaping parameter mainly refers to a parameter of the main lobe.

Figure 2:
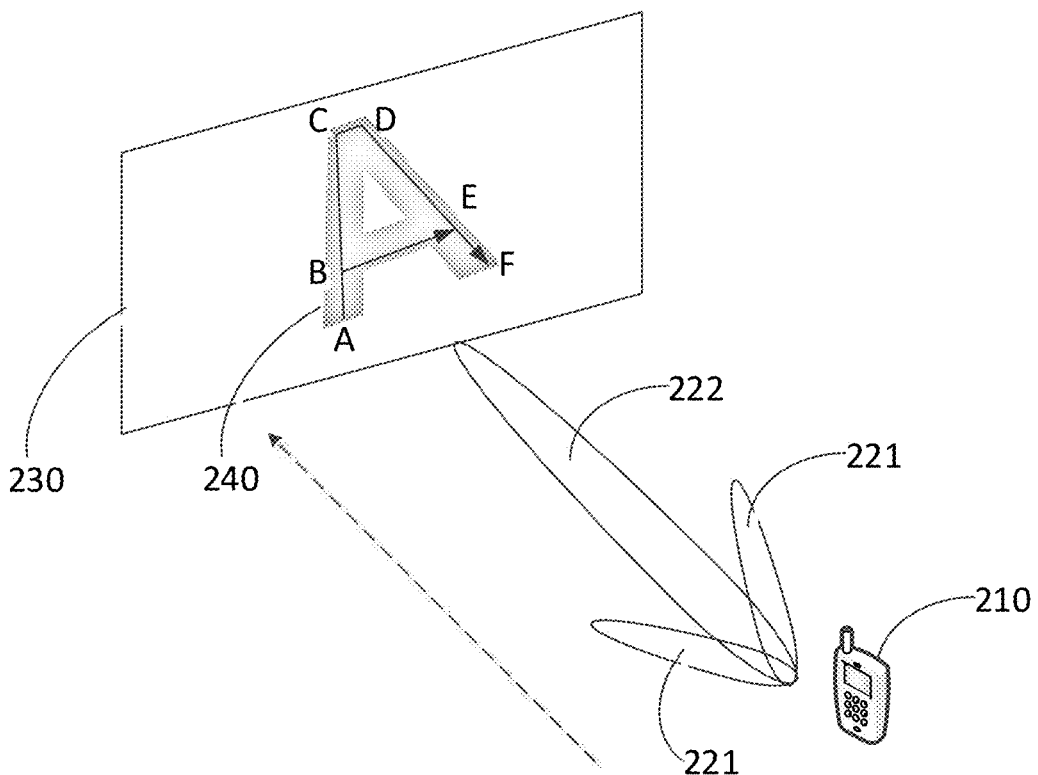
FIG. 2 is a schematic diagram of a display scenario in an implementing manner of the present application.

FIG. 2 is a schematic diagram of a display scenario. A terminal device 210 sends a beam to an LED array 230, to form an A-shaped pattern 240 on the LED array 230. The beam comprises a main lobe 222 and side lobes 221. The beam direction is a direction of the main lobe 222 of the beam, that is, the direction indicated by the dashed line arrow in FIG. 2. The beam intensity is related to a maximum extension distance of the main lobe 222. A larger beam intensity indicates a larger maximum extension distance of the main lobe 222. A smaller beam intensity indicates a smaller maximum extension distance of the main lobe 222. Generally, the beam intensity may be changed by adjusting transmit power of a beam sending side. With reference to FIG. 2, the terminal device 210 may comprise an antenna array, and the beam intensity may be changed by adjusting transmit power of the antenna array.

The scanning track of the beam is a movement track of the beam on the LED array. With reference to FIG. 2, the scanning track may be understood as a track indicated by an arrow on the A-shaped pattern 240. When the main lobe 222 of the beam moves on the LED array 230 along the scanning track shown in FIG. 2, LED units along the scanning track are illuminated in sequence, and a user sees the LED array 230 displaying the A-shaped pattern 240.

In an implementing manner, step S120 may comprise:

S121: Determine a to-be-displayed pattern according to the to-be-displayed content.

S122: Determine the beam shaping parameter according to the to-be-displayed pattern and the location of the LED array.

In this implementing manner, all to-be-displayed content is processed as patterns. In other words, what the to-be-displayed content is does not matter, and only pattern information of the to-be-displayed content such as a line and a shape matters, to make it convenient to determine the scanning track in the beam shaping parameter. As shown in FIG. 2, the method does not need to identify that the to-be-displayed content is a capital letter A, but directly obtains, according to a to-be-displayed pattern corresponding to the to-be-displayed content, the scanning tracks indicated by the two solid line arrows in the figure.

S140: Send a beam to the LED array according to the beam shaping parameter.

Specifically, in an implementing manner, this step may further comprise:

S141: Emit the beam according to the beam direction and the beam intensity.

S142: Control the beam to illuminate multiple LED units on the LED array in sequence according to the scanning track.

The beam direction may be a direction corresponding to any point on the scanning track. For simplicity, the beam direction may be a direction corresponding to a start point of the scanning track. Using FIG. 2 as an example, the beam direction is a direction from the terminal device 210 to the point A at the lower left corner of the A-shaped pattern in FIG. 2.

In step S142, the beam direction may be gradually changed, to cause a front end of the beam to move along the scanning track, to illuminate LED units on the scanning track in sequence. Using FIG. 2 as an example, the scanning track may be (A→B→C→D→E→F, B→E), and the main lobe 222 of the beam may scan starting from the point A at the lower left corner of the A-shaped pattern 240, reach the point B and continue to scan upward to reach the points C, D, E, and F in sequence, and then go back to the point B to scan from the point B to the point E. Alternatively, the scanning track may be (A→B→E→F, B→C→D→E), and the main lobe 222 of the beam may scan starting from the point A at the lower left corner of the A-shaped pattern 240, reach the point B and continue to scan right to reach the points E and F in sequence, and then go back to the point B to scan upward from the point B to the points C, D, and E in sequence.

In an implementing manner, step S142 may comprise:

S142': Repeatedly control, at a preset frequency, the beam to illuminate the multiple LED units on the LED array in sequence according to the scanning track.

The preset frequency is the number of times of scanning along the scanning track by the beam within a unit of time. Using a preset frequency of 60 as example, within one second, the beam scans, for example, along the scanning track (A→B→C→D→E→F, B→E) 60 times. In this case, the eyes of the user feel like all LED units on the scanning track are illuminated all the time, and visual experience can be provided to the user.

In an implementing manner, the method may further comprise:

S150: Obtain displayed content of the LED array.

S160: Adjust the beam shaping parameter according to the displayed content.

In this implementing manner, the displayed content of the LED array may be obtained by using, for example, a camera, and then the obtained displayed content may be compared with the to-be-displayed content, to discover a deviation in the display process, to adjust the beam shaping parameter. In other words, in this implementing manner, output of the beam sending device is adjusted in a feedback manner, which helps improve display quality of displayed content.

In some cases, different parts of the to-be-displayed content may have different line widths. In an implementing manner, the scanning track may be adjusted to output lines of different widths. For example, a wide part is scanned in parallel multiple times. However, this manner obviously decreases display efficiency. In another implementing manner, the beam shaping parameter further comprises a beam width. Step S120 may further comprise:

S121: Determine the beam width according to a line width of the to-be-displayed content.

In this implementing manner, the beam width may be changed according to the line width of the to-be-displayed content. Therefore, when different areas of the to-be-displayed content are output, the numbers of LED units illuminated by the beam once are different. Specifically, when a line of an area of the to-be-displayed content is wide, the beam width is increased, and the number of LED units illuminated once is increased. When a line of an area of the to-be-displayed content is narrow, the beam width is reduced, and the number of LED units illuminated once is reduced. In other words, the beam is similar to a brush, and a size of a tip of the brush may be changed by adjusting the beam width.

A person skilled in the art understands that, the beam width may be adjusted by changing the number of transmit antennas on a beam emitting end and an interval between different transmit antennas. Generally, a larger number of transmit antennas and a larger interval indicate a smaller beam width.

In addition, an embodiment of the present application further provides a computer readable medium, comprising a computer readable instruction, wherein when the computer readable instruction is executed, the following operations are executed: operations of steps S120 and S140 of the method in the implementing manner shown in FIG. 1.

In conclusion, according to the method in the present application, an electromagnetic beam may be sent to an LED array, to illuminate multiple LED units on the LED array along a scanning track, and output corresponding displayed content. For the LED array, input of a power supply is not required, which facilitates deployment.

Figure 3:
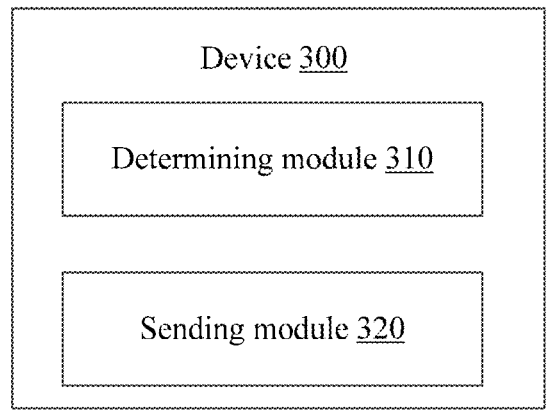
FIG. 3 is a diagram of modules of a display control device in an embodiment of the present application.

FIG. 3 is a schematic structural diagram of modules of a display control device according to an embodiment of the present application. The display control device may be disposed in a terminal device as a functional module, or the display control device may be used as an independent device to communicate with a beam emission device such as an antenna array to complete a corresponding function. The device 300 may comprise:

a determining module 310, configured to determine a beam shaping parameter according to to-be-displayed content and a location of an LED array, wherein the beam shaping parameter comprises a beam direction, a beam intensity, and a scanning track; and a sending module 320, configured to send a beam to the LED array according to the beam shaping parameter.

According to the device in this embodiment of the present application, displayed content can be presented on an LED array through beam shaping. The LED array does not need input of a power supply and implements a completely passive display, and therefore can be deployed more flexibly.

Functions of the determining module 310 and the sending module 320 are described below in detail by using specific implementing manners.

The determining module 310 is configured to determine a beam shaping parameter according to to-be-displayed content and a location of an LED array, wherein the beam shaping parameter comprises a beam direction, a beam intensity, and a scanning track.

The to-be-displayed content may be any content that can be displayed, for example, may be an image, a text, or a video. The LED array comprises multiple LED units. For example, the LED array is a 1024*768 array, and the LED array comprises 786432 LED units. The LED units may be illuminated after the beam is received.

The beam may be an electromagnetic beam, and may be output by an antenna array. The beam shaping parameter is a related parameter of a beam generated by using a beam shaping technology. Specifically, the beam may be output by controlling an antenna array. The beam generally comprises a main lobe and a side lobe, and the beam shaping parameter mainly refers to a parameter of the main lobe.

FIG. 2 is a schematic diagram of a display scenario. A terminal device 210 sends a beam to an LED array 230, to form an A-shaped pattern 240 on the LED array 230. The beam comprises a main lobe 222 and side lobes 221. The beam direction is a direction of the main lobe 222 of the beam, that is, the direction indicated by the dashed line arrow in FIG. 2. The beam intensity is related to a maximum extension distance of the main lobe 222. A larger beam intensity indicates a larger maximum extension distance of the main lobe 222. A smaller beam intensity indicates a smaller maximum extension distance of the main lobe 222. Generally, the beam intensity may be changed by adjusting transmit power of a beam sending side. With reference to FIG. 2, the terminal device 210 may comprise an antenna array, and the beam intensity may be changed by adjusting transmit power of the antenna array.

The scanning track of the beam is a movement track of the beam on the LED array. With reference to FIG. 2, the scanning track may be understood as a track indicated by an arrow on the A-shaped pattern 240. When the main lobe 222 of the beam moves on the LED array 230 along the scanning track shown in FIG. 2, LED units along the scanning track are illuminated in sequence, and a user sees the LED array 230 displaying the A-shaped pattern 240.

Figure 4:
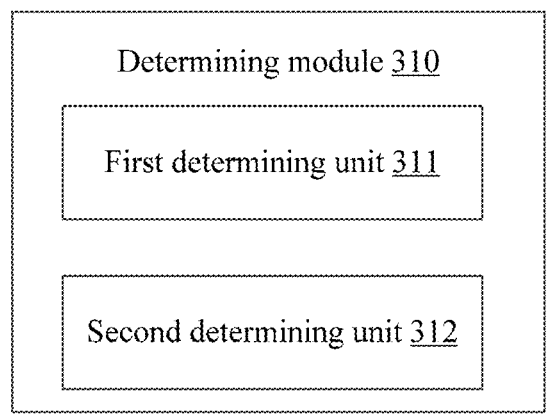
FIG. 4 is a diagram of modules of a determining module in an implementing manner of the present application.

In an implementing manner, referring to FIG. 4, the determining module 310 may comprise:

a first determining unit 311, configured to determine a to-be-displayed pattern according to the to-be-displayed content; and a second determining unit 312, configured to determine the beam shaping parameter according to the to-be-displayed pattern and the location of the LED array.

In this implementing manner, all to-be-displayed content is processed as patterns. In other words, what the to-be-displayed content is does not matter, and only pattern information of the to-be-displayed content such as a line and a shape matters, to make it convenient to determine the scanning track in the beam shaping parameter. As shown in FIG. 2, the method does not need to identify that the to-be-displayed content is a capital letter A, but directly obtains, according to a to-be-displayed pattern corresponding to the to-be-displayed content, the scanning tracks indicated by the two solid line arrows in the figure.

Figure 5:
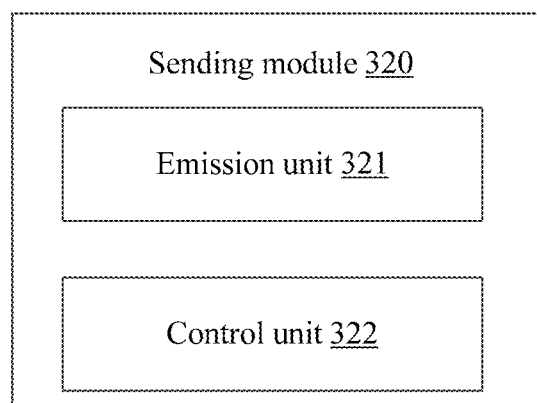
FIG. 5 is a diagram of modules of a sending module in an implementing manner of the present application.

In another implementing manner, referring to FIG. 5, the sending module 320 comprises:

an emission unit 321, configured to emit the beam according to the beam direction and the beam intensity; and a control unit 322, configured to control the beam to illuminate multiple LED units on the LED array in sequence according to the scanning track.

The beam direction may be a direction corresponding to any point on the scanning track. For simplicity, the beam direction may be a direction corresponding to a start point of the scanning track. Using FIG. 2 as an example, the beam direction is a direction from the terminal device 210 to the point A at the lower left corner of the A-shaped pattern in FIG. 2.

The control unit 322 may gradually change the beam direction, to cause a front end of the beam to move along the scanning track, to illuminate LED units on the scanning track in sequence. Using FIG. 2 as an example, the scanning track may be (A→B→C→D→E→F, B→E), and the main lobe 222 of the beam may scan starting from the point A at the lower left corner of the A-shaped pattern 240, reach the point B and continue to scan upward to reach the points C, D, E, and F in sequence, and then go back to the point B to scan from the point B to the point E. Alternatively, the scanning track may be (A→B→E→F, B→C→D→E), and the main lobe 222 of the beam may scan starting from the point A at the lower left corner of the A-shaped pattern 240, reach the point B and continue to scan right to reach the points E and F in sequence, and then go back to the point B to scan upward from the point B to the points C, D, and E in sequence.

In an implementing manner, the control unit 322 is configured to repeatedly control, at a preset frequency, the beam to illuminate the multiple LED units on the LED array in sequence according to the scanning track.

The preset frequency is the number of times of scanning along the scanning track by the beam within a unit of time. Using a preset frequency of 60 as example, within one second, the beam scans, for example, along the scanning track (A→B→C→D→E→F, B→E) 60 times. In this case, the eyes of the user feel like all LED units on the scanning track are illuminated all the time, and visual experience can be provided to the user.

Figure 6:
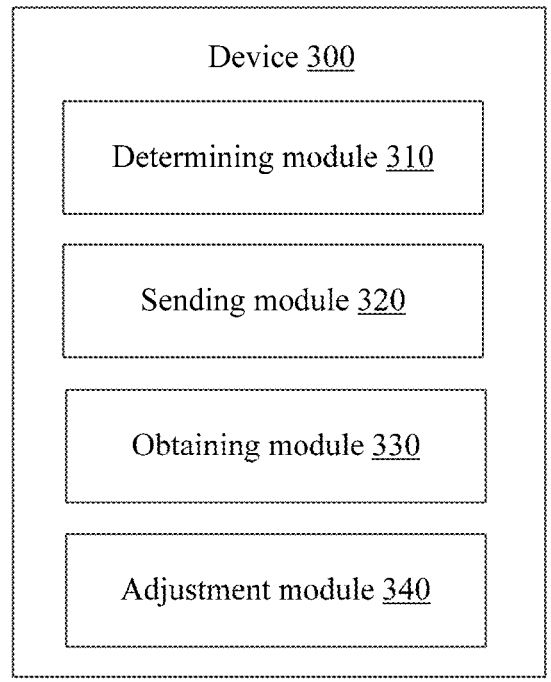
FIG. 6 is a diagram of modules of a display control device in another implementing manner of the present application.

In an implementing manner, referring to FIG. 6, the device 300 further comprises:

an obtaining module 330, configured to obtain displayed content of the LED array; and an adjustment module 340, configured to adjust the beam shaping parameter according to the displayed content.

In this implementing manner, the displayed content of the LED array may be obtained by using, for example, a camera, and then the obtained displayed content may be compared with the to-be-displayed content, to discover a deviation in the display process, to adjust the beam shaping parameter. In other words, in this implementing manner, output of the beam sending device is adjusted in a feedback manner, which helps improve display quality of displayed content.

In some cases, different parts of the to-be-displayed content may have different line widths. In an implementing manner, the scanning track may be adjusted to output lines of different widths. For example, a wide part is scanned in parallel multiple times. However, this manner obviously decreases display efficiency. In another implementing manner, the beam shaping parameter further comprises a beam width. The determining module 310 is further configured to determine the beam width according to a line width of the to-be-displayed content.

In this implementing manner, the beam width may be changed according to the line width of the to-be-displayed content. Therefore, when different areas of the to-be-displayed content are output, the numbers of LED units illuminated by the beam once are different. Specifically, when a line of an area of the to-be-displayed content is wide, the beam width is increased, and the number of LED units illuminated once is increased. When a line of an area of the to-be-displayed content is narrow, the beam width is reduced, and the number of LED units illuminated once is reduced. In other words, the beam is similar to a brush, and a size of a tip of the brush may be changed by adjusting the beam width.

In conclusion, according to the device in the present application, an electromagnetic beam may be sent to an LED array, to illuminate multiple LED units on the LED array along a scanning track, and output corresponding displayed content. For the LED array, input of a power supply is not required, which facilitates deployment.

Figure 7:
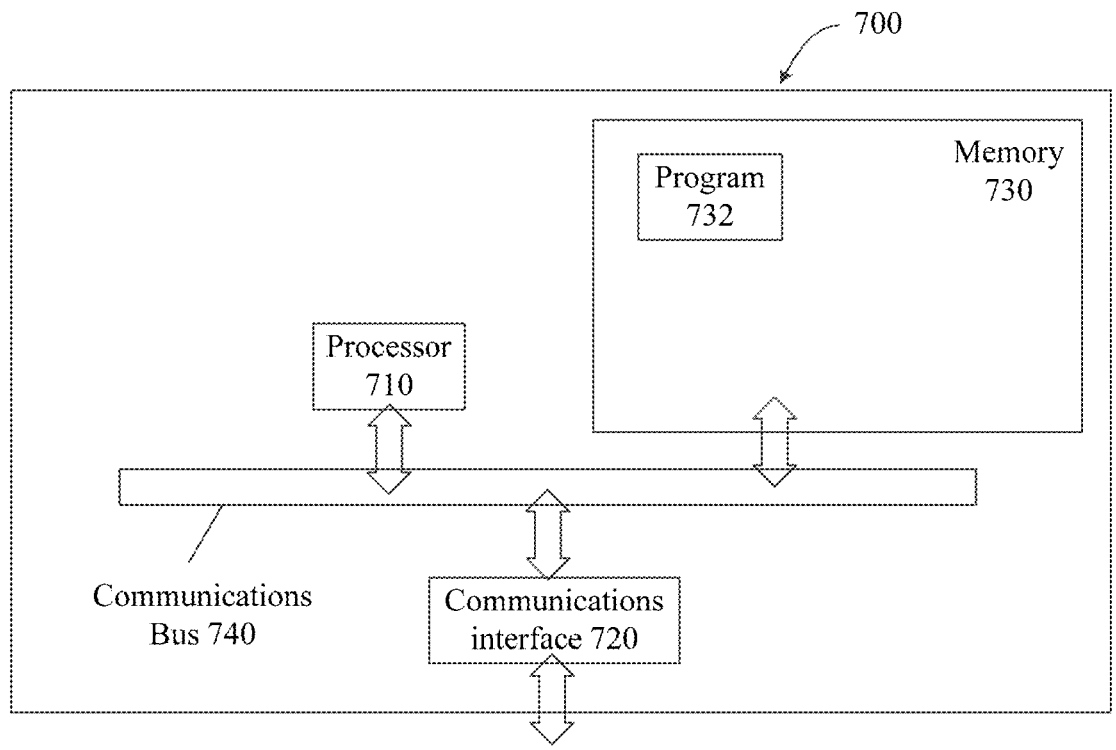
FIG. 7 is a schematic diagram of a hardware structure of a UE according to an embodiment of the present application.

A hardware structure of a UE according to an embodiment of the present application is shown in FIG. 7. A specific embodiment of the present application does not limit specific implementation of the UE. Referring to FIG. 7, the UE 700 may comprise:

a processor 710, a communications interface 720, a memory 730, and a communications bus 740.

The processor 710, the communications interface 720, and the memory 730 communicate with each other by using the communication bus 740.

The communications interface 720 is configured to communicate with another network element.

The processor 710 is configured to execute a program 732, and may specifically execute related steps in the method embodiment shown in FIG. 1.

Specifically, the program 732 may comprise program code, wherein the program code comprises a computer operation instruction.

The processor 710 may be a central processing unit (CPU), or an application specific integrated circuit (ASIC), or be configured into one or more integrated circuits for implementing the embodiments of the present application.

The memory 730 is configured to store the program 732. The memory 730 may comprise a high-speed random access memory (RAM), and may further comprise a non-volatile memory, for example, at least one magnetic disk storage. The program 732 may be specifically configured to execute the following steps:

determining a beam shaping parameter according to to-be-displayed content and a location of an LED array, wherein the beam shaping parameter comprises a beam direction, a beam intensity, and a scanning track; and sending a beam to the LED array according to the beam shaping parameter.

For specific implementation of the steps in the program 732, reference may be made to corresponding steps and modules in the foregoing embodiments, and details are not described herein again. It may be clearly understood by a person skilled in the art that, for the purpose of convenient and brief description, for specific working processes of the foregoing devices and modules, reference may be made to corresponding processes in the foregoing method embodiments, and the details are not described herein again.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in the form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and comprises several instructions for instructing a computer device (which may be a personal computer, a controller, a network device, or the like) to perform all or a part of the steps of the methods described in the embodiments of the present application. The storage medium comprises any medium that can store program code, such as a USB flash drive, a removable hard disk, a read-only memory (ROM), a RAM, a magnetic disk, or an optical disc.

The foregoing implementing manners are merely intended to describe the present application rather than limit the present application. A person of ordinary skill in the art may make modifications and variations without departing from the spirit and scope of the present application. Therefore, all equivalent technical solutions shall also fall within the scope of the present application, and the patent protection scope of the present application shall be subject to the claims.

What is claimed is:

1. A display control method, comprising:

determining, by a terminal device held by a user, a to-be-displayed pattern according to a to-be-displayed content;

determining, by the terminal device held by the user, a beam shaping parameter according to the to-be-displayed content and a location of a light-emitting diode (LED) array, wherein the beam shaping parameter comprises a beam direction, a beam intensity, and a scanning track of a beam, and wherein the scanning track of a beam is a movement track of the beam on the LED array;

emitting, by the terminal device held by the user, a beam to the LED array according to the beam direction and the beam intensity; and controlling, by the terminal device held by the user, the beam to move on the LED array along the scanning track to illuminate multiple LED units on the LED array in sequence for displaying the to-be-displayed pattern on the LED array, by:

repeatedly controlling, at a preset frequency, the beam to illuminate the multiple LED units on the LED array in sequence according to the scanning track, wherein the preset frequency is a number of times of scanning along the scanning track by the beam within a unit of time.

2. The method of claim 1, further comprising:

obtaining displayed content of the LED array; and adjusting the beam shaping parameter according to the displayed content.

3. The method of claim 1, wherein the beam shaping parameter further comprises a beam width; and the determining a beam shaping parameter according to the to-be-displayed content and a location of an LED array further comprises:

determining the beam width according to a line width of the to-be-displayed content.

4. The method of claim 1, wherein the beam is an electromagnetic beam.

5. A display control device held by a user, wherein the device comprises:

a determining module, configured to determine a to-be-displayed pattern according to a to-be-displayed content, and determine a beam shaping parameter according to the to-be-displayed content and a location of a light-emitting diode (LED) array, wherein the beam shaping parameter comprises a beam direction, a beam intensity, and a scanning track of a beam, and wherein the scanning track of a beam is a movement track of the beam on the LED array;

an emission unit, configured to emit the beam according to the beam direction and the beam intensity; and a control unit, configured to control the beam to move on the LED array along the scanning track to illuminate multiple LED units on the LED array in sequence for displaying the to-be-displayed pattern on the LED array, wherein the control unit is configured to repeatedly control, at a preset frequency, the beam to illuminate the multiple LED units on the LED array in sequence according to the scanning track, and wherein the preset frequency is a number of times of scanning along the scanning track by the beam within a unit of time.

6. The device of claim 5, further comprising:

an obtaining module, configured to obtain displayed content of the LED array; and an adjustment module, configured to adjust the beam shaping parameter according to the displayed content.

7. The device of claim 5, wherein the beam shaping parameter further comprises a beam width; and the determining module is further configured to determine the beam width according to a line width of the to-be-displayed content.

8. User equipment (UE), wherein the UE comprises the display control device of claim 5.

9. User equipment (UE) held by a user, wherein the UE comprises:

a memory, configured to store an instruction; and a processor, configured to execute the instruction stored in the memory, wherein the instruction causes the processor to execute the following operations:

determining a to-be-displayed pattern according to a to-be-displayed content;

determining a beam shaping parameter according to the to-be-displayed content and a location of a light-emitting diode (LED) array, wherein the beam shaping parameter comprises a beam direction, a beam intensity, and a scanning track of a beam, and wherein the scanning track of a beam is a movement track of the beam on the LED array;

emitting a beam to the LED array according to the beam direction and the beam intensity; and controlling the beam to move on the LED array along the scanning track to illuminate multiple LED units on the LED array in sequence for displaying the to-be-displayed pattern on the LED array, by:

repeatedly controlling, at a preset frequency, the beam to illuminate the multiple LED units on the LED array in sequence according to the scanning track, wherein the preset frequency is a number of times of scanning along the scanning track by the beam within a unit of time.

* * * * *